(12) United States Patent
Smith et al.

(10) Patent No.: US 9,930,021 B2
(45) Date of Patent: Mar. 27, 2018

(54) SECURE DEVICES USING ENTROPY MULTIPLEXING

(71) Applicant: Intel Corporation, Santa Clara, CA (US)

(72) Inventors: Ned M. Smith, Beaverton, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 14/988,210

(22) Filed: Jan. 5, 2016

(65) Prior Publication Data

US 2017/0195303 A1    Jul. 6, 2017

(51) Int. Cl.
| | |
|---|---|
| *H04L 29/06* | (2006.01) |
| *H04L 7/00* | (2006.01) |
| *H04W 12/04* | (2009.01) |
| *H04L 9/32* | (2006.01) |
| *H04L 9/08* | (2006.01) |

(52) U.S. Cl.
CPC ............ *H04L 63/06* (2013.01); *H04L 7/0008* (2013.01); *H04L 9/0836* (2013.01); *H04L 9/0861* (2013.01); *H04L 9/3273* (2013.01); *H04W 12/04* (2013.01); *H04L 2209/24* (2013.01)

(58) Field of Classification Search
CPC .......................... H04L 9/0836; H04L 2209/24
See application file for complete search history.

(56) References Cited

U.S. PATENT DOCUMENTS

| | | | | |
|---|---|---|---|---|
| 8,515,389 | B2* | 8/2013 | Smetters | G08C 17/00 380/225 |
| 9,323,950 | B2* | 4/2016 | Maletsky | G06F 21/57 |
| 2002/0094088 | A1* | 7/2002 | Okaue | G11B 20/00086 380/278 |
| 2007/0297613 | A1* | 12/2007 | Ghosh | H04L 9/0836 380/277 |
| 2010/0034383 | A1* | 2/2010 | Turk | H04L 41/0816 380/262 |
| 2011/0138192 | A1* | 6/2011 | Kocher | G06F 21/602 713/189 |
| 2015/0351068 | A1* | 12/2015 | Deleeuw | H04W 64/00 455/456.1 |
| 2016/0012252 | A1* | 1/2016 | Deleeuw | G06F 21/6254 726/26 |
| 2016/0371685 | A1* | 12/2016 | Smith | G06Q 20/40 |

* cited by examiner

*Primary Examiner* — James R Turchen
(74) *Attorney, Agent, or Firm* — Schwegman Lundberg & Woessner, P.A.

(57) ABSTRACT

Systems and techniques for implementing secure devices using entropy multiplexing are described herein. An entropy-multiplexing (EM) tree containing a plurality of tree depths may be accessed. A first message may be transmitted to a set of neighbor devices. At least a portion of the first message may be encrypted using a first seed value generated using a first tree depth of the plurality of tree depths and a first clock value of a device. A response may be received from a neighbor device of the set of neighbor devices. The response may include a second message. The second message may be encrypted using a second seed value generated using a second tree depth of the plurality of tree depths and a second clock value. The second message may be decrypted using a third seed value generated using the second tree depth and a third clock value of the device.

18 Claims, 7 Drawing Sheets

SECURE DEVICES USING ENTROPY MULTIPLEXING

BACKGROUND

Internet of things (IoT) networks contain a group of internet connected devices that communicate with each other. The communication may be secured. IoT networks may rely on a single centralized IoT Key Manager (IKM). Central key managers may serialize key distribution in response to multicast publication of content needing encryption and/or decryption. The key distribution may be unreliable during high workloads.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Internet of things (IoT) networks may contain a plurality of interconnected devices that may be capable of providing a variety of data (e.g., sensor data, etc.). It may be desirable to secure communications among the communications of the plurality of devices to prevent malicious attacks or inadvertent release of sensitive information. Current security schemes may employ key based security for encrypting communications between devices. A centralized key management server may be used for key distribution. However, the central key management server may be a single point of failure in such a security scheme. For example, if the central key management server is unavailable, device messages may be communicated without security which may open the communications up to interception. The central key management server may also create a feast or famine scenario where the central key management server reliably delivers keys to certain devices on a regular basis (e.g., devices on a low-latency connection, etc.) and unreliably delivers keys to other certain devices on a regular basis (e.g., devices on a high-latency connection, etc.). Key distribution performance may also suffer because the central key management server may have to distribute keys to every device on the network.

The present subject matter addresses the problem of centralized key managers in IoT networks by empowering a plurality of devices (e.g., nodes) to act as key management servers. In an example, a gossip synchronization protocol may be employed that synchronizes a group symmetric key. Each device may originate the group symmetric key then contact its nearest neighbors to propagate the key. IoT devices in a given IoT domain may use factory provisioned enhanced privacy ID (EPID) keys to establish secure session keys over which the gossip protocol between nearest neighbors may be conducted with confidentiality and integrity protections. The EPID key may be used to attest to the trusted execution environment (TEE) in which the session and group symmetric keys may be stored and/or used. A white list of acceptable TEE configurations and acceptable manufacturer certificates may be provisioned beforehand to allow verification of the attestation values.

The present subject matter may employ Entropy Multiplexing (EM) which is a technique for distributed generation of random numbers that produce the same seed values on participating nodes. In an example, EM may be used to construct a "Seed Tree" that is used to manage refreshing of long lived group keys which may be useful in that the nodes themselves may use the seed tree to refresh the keys which may reduce communication overhead on the network. The EM tree may also be used to synchronize clock drift in the participating nodes. The technique may encrypt the clock value with an EM key that is encoded to a specific time of day T0. When the gossip exchange results in receipt of the encrypted clock value, the receiver attempts to decrypt it with the key coded to the specific time T0. If the recipient's clock has drifted beyond the end of the period in which the T0 key is valid, the next key T1 will not successfully decrypt the message. If the T0 key is successful then the gossip delivery times are summed and subtracted from the current clock. The difference between this value and when the T1 key was created represents the skew. The receiving device may adjust its clock to more closely match that of the original sender. In this way the participants may maintain similar clocks. In some embodiments, an M of N threshold schema may be employed using recursive iteration of the described sequence to distinguish which nodes should be considered authoritative time sources where M represents a particular clock skew value and N represents a number of devices with that particular clock skew value. For example, if a majority of nodes agree on current time then the minority will regard the majority as authoritative. In some examples, the minority may then synchronize their clocks to agree with the majority. In an example, sampling the clocks of all nodes may use the gossip protocol to encrypt the time at T0 and may then propagate it to every other node.

The present subject matter may provide more scalability because each device may be enabled to act as a key management server which may allow key managers to be added as new devices are added to the network. The present subject matter may provide more reliability than a centralized key management server by spreading key management duties across the plurality of devices in the network. For example, if a device enabled for key management goes offline a device may be able to contact a neighbor device enabled for key management to receive a key. The present subject matter may provide more efficient parallel key distribution compared to the sequential key distribution provided by a centralized key management server. The present subject matter may provide efficient clock synchronization by using the EM seed tree for key rotation and verifying clock sync at each rotation.

Figure 1:
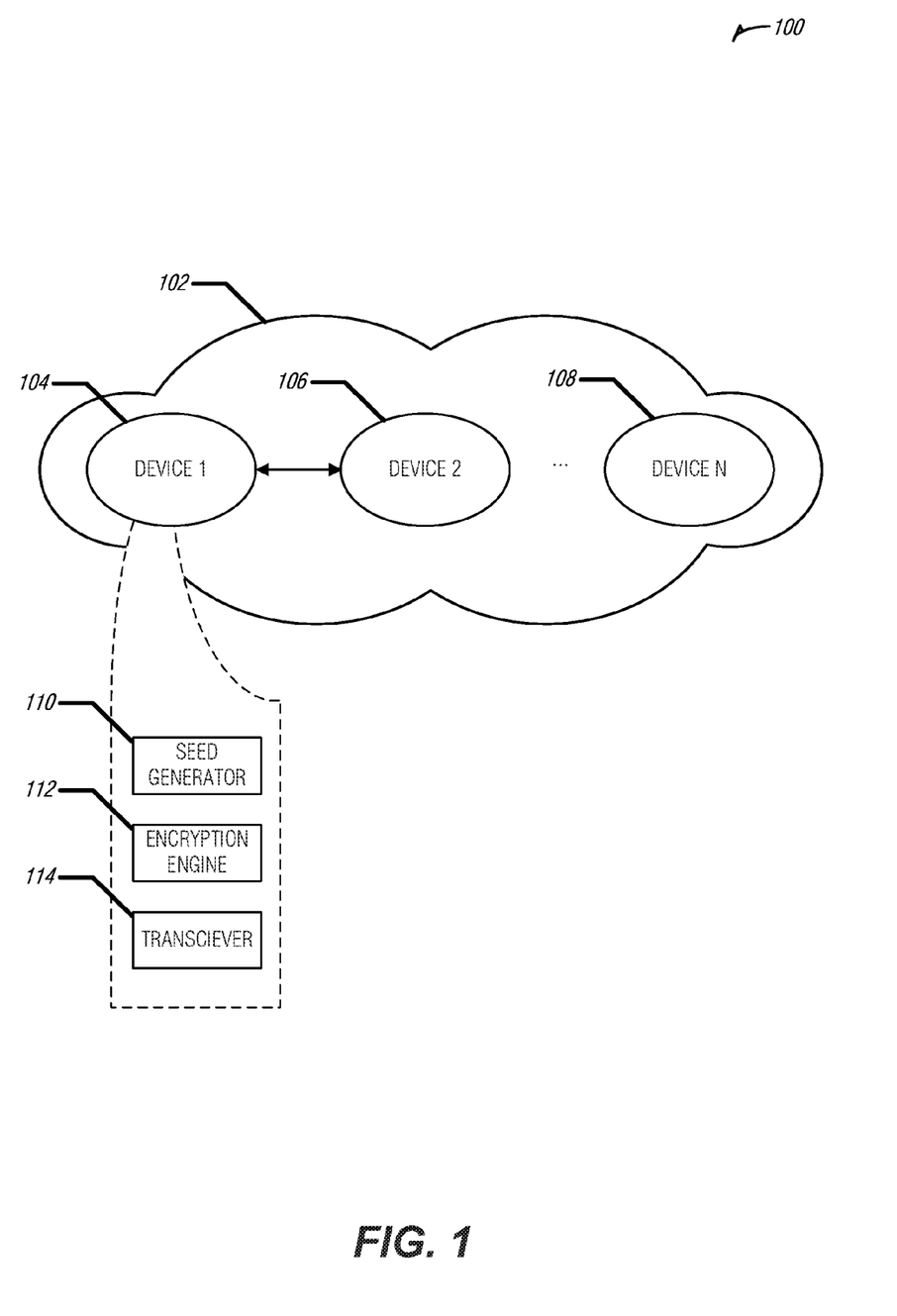
FIG. 1 illustrates an environment including a system for secure devices using entropy multiplexing, according to an embodiment.

FIG. 1 illustrates an environment including a system 100 for secure devices using entropy multiplexing, according to an embodiment. The environment may include a network 102 (e.g., an EPID group of IoT devices, etc.). The network 102 may include a plurality of devices including device 1 104, device 2 106, and a number of other devices such as device N 108. Each device on the network 102 may collect and exchange data. For example, device 1 104 and device 2 106 may be neighboring devices and data exchange partners.

Device 1 104 and device 2 106 may use factory provisioned EPID keys and/or RSA keys to establish a secure session over which a gossip protocol may be conducted confidentially with integrity protection. In an example, the secure session may be established using an attested trusted execution environment (TEE). In an example, the EPID key may be used to attest to the TEE in which the session keys and group symmetric keys are stored and/or used. In an example, a white list of acceptable TEE configurations and acceptable manufacturer certificates may be provisioned at manufacture to allow verification of the attestation values. For example, device 1 104 and device 2 106 may be configured by a manufacturer with an EPID group key that may be used by each device to attest to the integrity of the TEE of each device. Policy based re-attestation may be periodically performed to ensure that devices have not been compromised. In an example, the system 100 may be included in device 1 104. In an example, the system 100 may be executing in the TEE of device 1 104. The system 100 may include a seed generator 110, an encryption engine 112, and a transceiver 114.

In some examples, device 1 104 may receive a respective security configuration of each neighbor device of a set of neighbor devices (e.g., device 2 106, etc.), a secure communication channel may be established with respective devices of the set of neighbor devices based on an evaluation of the respective security configuration against a set of acceptable security configurations, and may transmit a first message using the secure communication channel. In an example, the evaluation may include comparing a security key included in the security configuration with a security key included in the set of acceptable security configurations. In an example, the security key may be an EPID key. In an example, the security key may be an RSA key. In some examples, a challenge message may be transmitted to a neighbor device of the set of neighbor devices using a first seed value, a challenge response may be received from the neighbor device, and secure communication may be discontinued with the neighbor device based on the challenge response being outside a designated threshold.

The seed generator 110 may be used to generate a key or seed value based on a clock value of a device. In an example, an entropy multiplexing (EM) seed tree may be distributed to each device in network 102. In an example, the EM seed tree may contain a plurality of branches or depths based on different time periods each containing one or more seeds. For example, an EM tree may have a yearly seed, monthly seeds, weekly seeds, daily seeds, and hourly seeds, etc. A clock value of a device such as device 1 104 may be used to select the appropriate seed at the appropriate seed depth. In an example, the seed and the clock value may be used to generate a seed value. In an example, the seed value may be a random number.

Each device in network 102 may have the EM tree which may allow the devices, such as device 1 104 and device 2 106, to generate the same random number for the same clock value or range of clock values. For example, device 1 104 may generate a random number at noon on a particular day, month, and year and device 2 106 may generate the same random number at noon on the particular day, month, and year.

The encryption engine 112 may encrypt and decrypt messages sent or received by a device. In an example, device 1 104 may access an entropy-multiplexing (EM) tree containing a plurality of tree depths. The system 100 may include a transceiver 114 that may be used to transmit and receive messages. In an example, device 1 104 may transmit a first message to a set of neighboring devices (e.g., a set including device 2 106, etc.). At least a portion of the first message may be encrypted using a first seed value generated using a first tree depth of the plurality of tree depths and a first clock value of device 1 104. In an example, the seed value may be used to generate an EM key that may be encoded to a specific time of day (e.g., T0, etc.). For example, device 1 104 (e.g., zero level device) may generate an EM key encoded with time T0 for a message generated indicating that it is the originator of the message. In an example, device 2 106 (e.g., a neighbor level one device) may generate an EM key encoded with time T0 to decode the message received from device 1 104. In an example, device 2 106 may generate an EM key encoded with time T1 for retransmitting the message to its neighbor devices. This may allow the message to propagate throughout the network encrypted with a new key value at each level of retransmission.

In an example, the at least a portion of the first message may include a group key. In an example, the group key may be one of a content consumption key and a content publishing key. In an example, the content consumption key and the content publishing key may be different. For example, a content publishing key may be used to publish content for consumption by other devices and a content consumption key may be used to consume content published by a device.

In an example, the first message may be transmitted to a device on a different network using the neighbor device. In some embodiments, the different network may be trusted to perform an "out-of-band" communication of the EM seed so that an attacker is not privy to the EM seed used by all the nodes in the network 102. In an example, the different network may include an encrypted session using a key that is established by a management service when nodes are added to the mesh network. In an example, the different network may include an encrypted session established using a certificate authenticated Diffie-Hellman key agreement that may result in a key. In an example, the different network may include an encrypted session established using a secret passphrase known to an administrator that subsequently uses a password authenticated key exchange (PAKE) protocol to establish the key.

In an example, device 1 104 may receive a response from a neighbor device (e.g., device 2 106, etc.). The response may include a second message. The second message may be encrypted using a second seed value generated using a second tree depth of the plurality of tree depths and a second clock value (e.g., a clock value of device 2 106. For example, device 2 106 may generate an EM key encoded with time T1 to transmit the message to device 1 104.

In an example, device 1 104 may decrypt the second message using a third seed value generated using the second tree depth and a third clock value of device 1 104. For example, device may generate an EM key encoded with time T1 and use the key to decrypt the second message.

In some examples, device 1 104 may generate a third message at a predetermined time interval. The third message may be encrypted using a fourth seed value generated using the first tree depth and a fourth clock value of device 1 104. In an example, the time interval may be a period of time taken to transmit the first message to a set of devices on the network 102.

In some examples, the EM tree may be used to synchronize the clocks of devices on network 102. The techniques described used clock values of the various devices to encrypt and decrypt messages. If the clocks of the devices are skewed (e.g., too far out of sync, etc.) the devices may generate an improper encryption of decryption key. For example, device 1 104 may transmit a message using an EM key encoded with time T0 to device 2 106. If the clock on device 2 106 is skewed such that its clock value is outside the expiration of time T0 it may generate an EM key encoded for time T1 which may not be able to properly decrypt the message. In an example, the at least a portion of the first message may include a master clock value. In an example, the master clock value may be received and a clock of the device may be synchronized using the clock value.

In an example, a clock value encrypted with an EM key encoded with time T0 may be transmitted from device 1 104 to device 2 106. Device 2 106 may decrypt the clock value using an EM key encoded with time T0. The delivery times may be summed and subtracted from a current clock value of device 2 106 to determine the clock skew. Device 2 106 may adjust its clock value to match the clock value of device 1 104 as indicated by the clock value contained in the message. The clocks of the devices on network 102 may be periodically synchronized to ensure that a device does not develop clock skew severe enough to hinder the encryption and decryption process.

Figure 2:
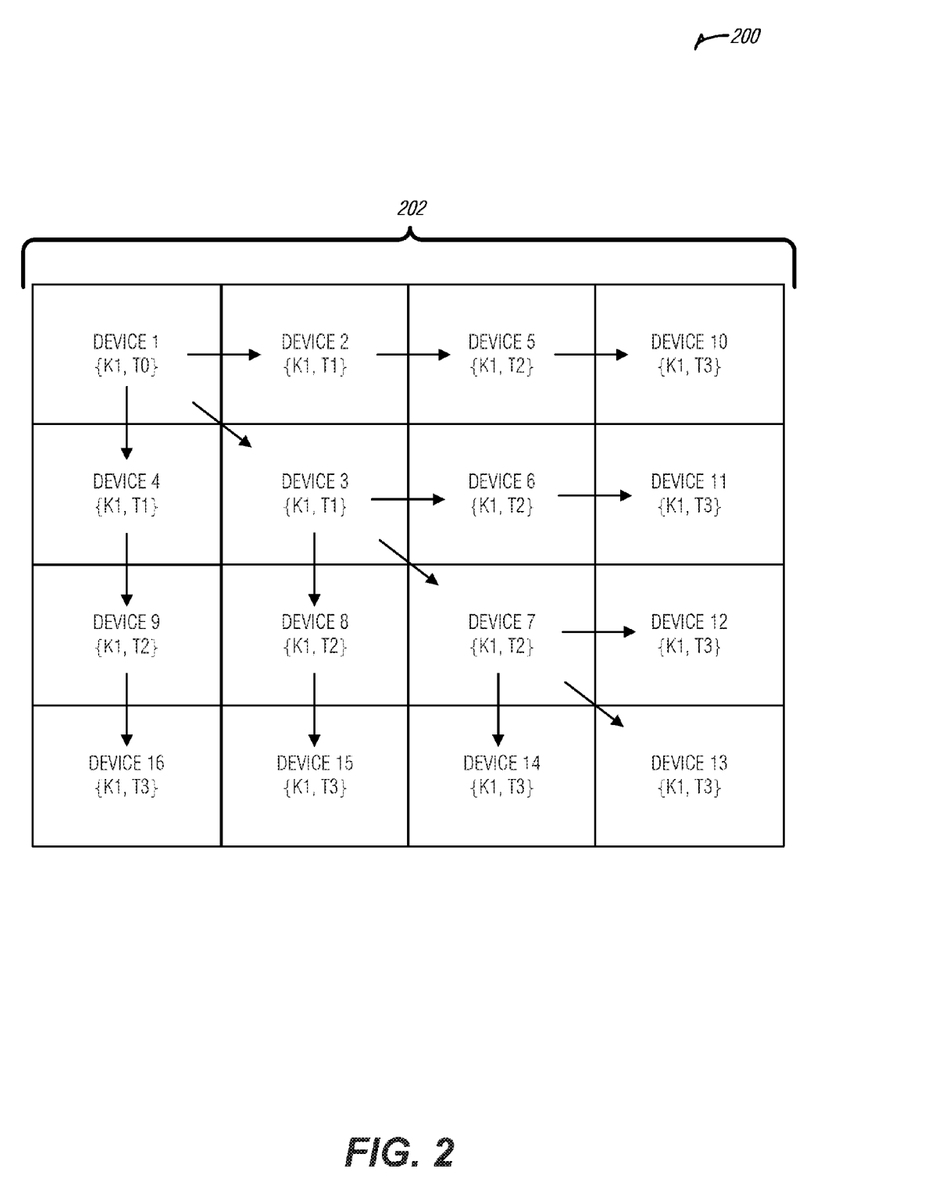
FIG. 2 illustrates an example of a key distribution for secure devices using entropy multiplexing, according to an embodiment.

FIG. 2 illustrates an example of a key distribution 200 for secure devices using entropy multiplexing, according to an embodiment. The key distribution 200 may be done securely by establishing a secure channel overwhich the gossip protocol may be performed. The devices may use a factory provisioned EPID key for attestation of a trusted execution environment (TEE) to establish a secure connection. Keys may then be exchanged between neighbors without using a central key manager. Attestation may occur, periodically, between neighboring devices to maintain trust across the network of devices.

In some embodiments, EM keys may be used to encrypt and decrypt messages between devices including symmetric keys (e.g., group keys, content publishing keys, content consumption keys, etc.). A group of network devices 202 may propagate a key (e.g., K1) to neighboring devices at various time intervals (e.g., T0, T1, T2, and T3). At each time slot (e.g., T1), the group key, K1, may be distributed to a device's closest neighboring devices. The message may be encrypted using an EM key generated for a particular time and or time period as described above in FIG. 1.

Figure 3:
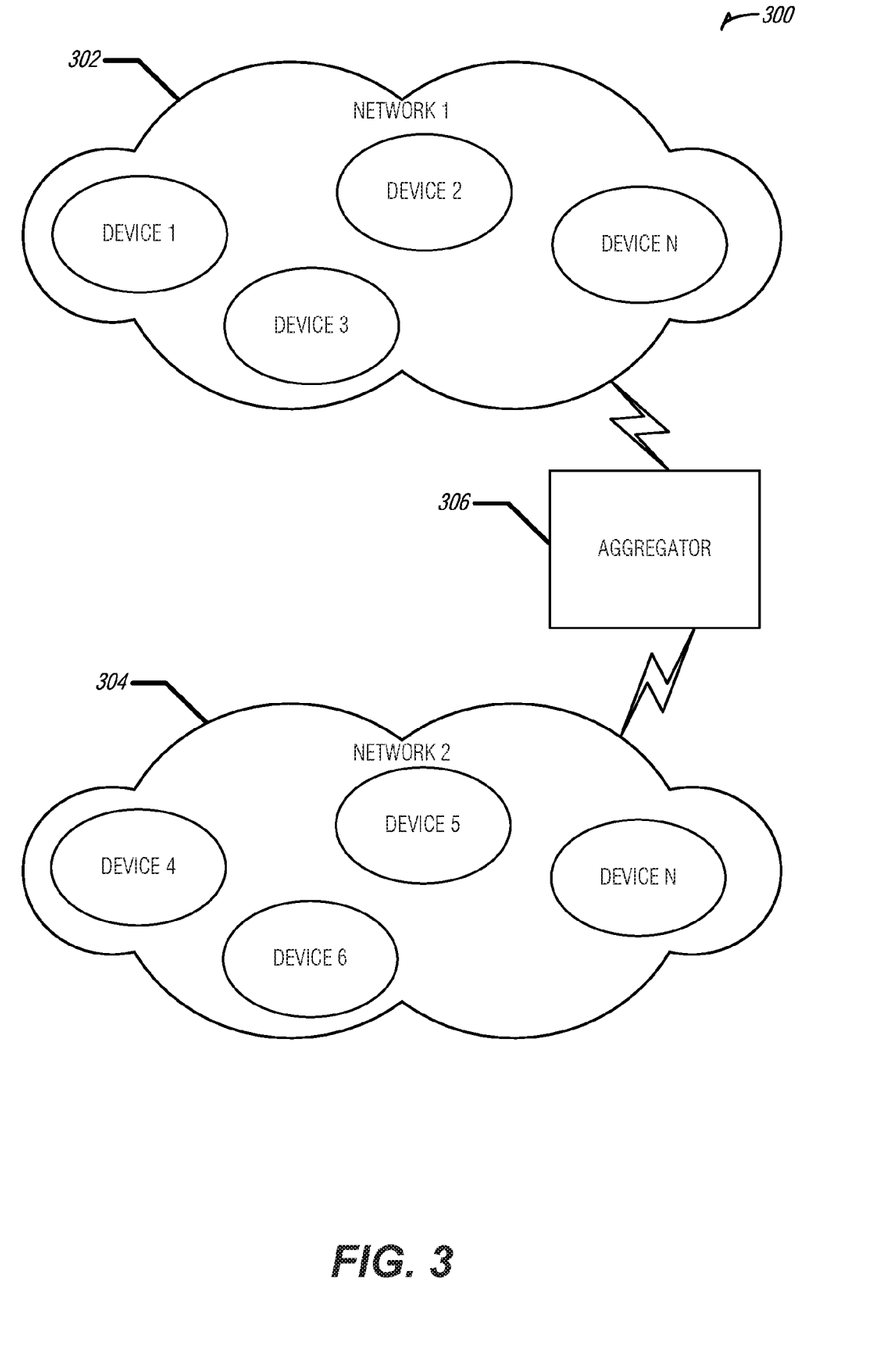
FIG. 3 illustrates an example of an environment and aggregator for implementing secure devices using entropy multiplexing between multiple networks, according to an embodiment.

FIG. 3 illustrates an example of an environment 300 and aggregator 306 for implementing secure devices using entropy multiplexing between multiple networks, according to an embodiment. Environment 300 may include a first device network 302 (e.g., a first EPID group) and a second device network 304 (e.g., a second EPID group). The first device network 302 and the second device network 304 may be communicatively coupled to the aggregator 306 (e.g., via wireless network, etc.).

The gossip protocol may be bridged across a set of devices that are part of the first device network 302 and the second device network 304. Each device in the first device network 302 may use a key (e.g., K1) to encrypt their respective content at a time interval (e.g., t1). The aggregator 306 may perform brokerage service across the first device network 302 and the second device network 304 for external network communication (e.g., communication between a device of the first device network 302 and a device of the second device network 304). In an example, the aggregator 306 may establish a key with one or more devices in the first device network 302 and the second device network 304 such that a seed value from the first device network 302 may be propagated to the second device network 304 in the event that devices in both networks are to cooperate as a single network. In some examples, more than one aggregator 306 may be present to provide continuous key brokerage as it may only take one successful aggregator to transmit the gossip message for the second device network 304 to be updated with a key of the first device network 302.

In an example, a device of the first device network 302 may propagate and/or publish a key (e.g., K1) to the aggregator 306. The aggregator may then propagate the key to a device of the second device network 304. Likewise, a device of the second device network 304 may propagate a key (e.g., K2) to the aggregator 306 which may then propagate the key to a device of the first device network 302. The key may be propagated as described in FIGS. 1 and 2. Once the key is propagated each device on the first device network 302 may communicate securely with each device of the second device network 304.

Figure 4:
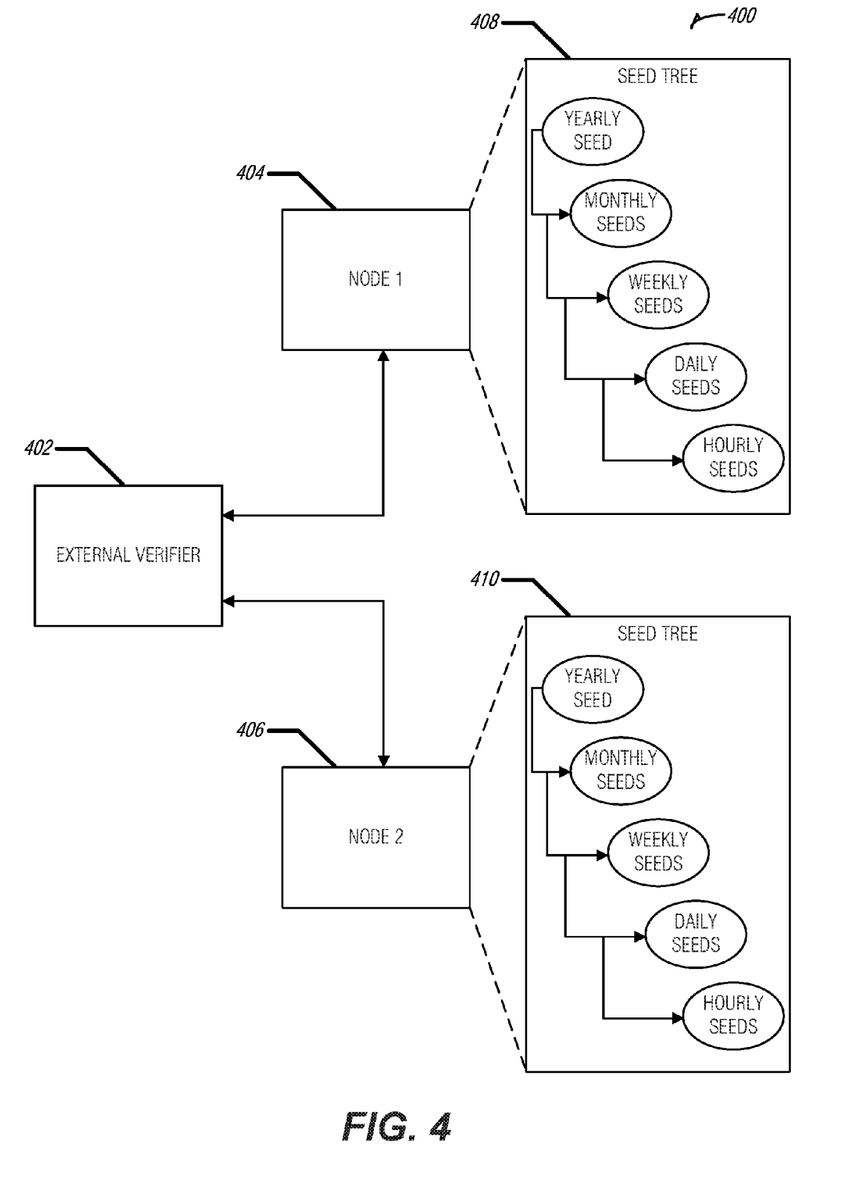
FIG. 4 illustrates an example of a process and data flow for implementing secure devices using entropy multiplexing, according to an embodiment.

FIG. 4 illustrates an example of a process and data flow 400 for implementing secure devices using entropy multiplexing, according to an embodiment. An external verifier 402 (e.g., a master device of a device network, etc.) may be communicatively coupled (e.g., via wireless network, etc.) to a first node 404 (e.g., a first neighbor device of the external verifier 402, etc.) and a second node 406 (e.g., a second neighbor device of the external verifier 402, etc.). The first node 404 may include a first EM seed tree 408 and the second node 406 may contain a second EM seed tree 410. Under normal operation the first seed tree 408 and the second seed tree 410 may be identical.

The first EM seed tree 408 and the second EM seed tree 410 may be used to generate seed values at a given tree depth that may be used for clock synchronization. Clock synchronization may be used for each of the first node 404 and the second node 406 to determine key expiry and to rotate keys. In an example, different keys may be distributed for various encryption and/or decryption tasks. Clock synchronization may be achieved via a dedicated clock synchronization control message transmitted across the network at specified time interval.

It may be possible for an attacker to compromise the clock value of a device on the network. If a majority of devices are compromised it may be possible for the compromised devices to provide incorrect clock values to other devices on the network. In an example, a Diffie-Hellman (DH) protocol may be employed to identify whether or not a device is lying about its state (e.g., whether the device has been compromised). For example, it may be determined whether or not the clock skew of the device is being used to cause clocks on the devices to become skewed. The external verifier 402, the first node 404, and the second node 406, may agree on a prime number and a base (e.g., a "g" value). The external verifier 402 may generate a secret value "a" and each of the first node 404 and the second node 406 may generate respective secret values "b."

In an example, the external verifier 402 may establish a secure connection to the first node 404 and the second node 406 using a seed for the current time in an EM tree of the external verifier 402 and transmit a g^a value (a non-public secret generated using the prime number, the shared secret "g," and its secret "a"). In response, the first node 404 and the second node 406 may generate and transmit a g^b value (a non-public secret generated using the prime number, the shared secret "g," and their respective secret "b") using a seed for the current time in the first EM tree 408 and the second EM tree 410, respectively. If there is clock skew then the first node 404 and/or the second node 406 may select the wrong g^b value.

The external verifier 402 may evaluate a number of nodes that return a given value. In an example, the external verifier 402 may determine that a particular g^b value, whether authentic or compromised, is prevalent on the network. For example, the first node 404 and the second node 406 may return the same incorrect g^b value. If the majority of other devices on the network report the same incorrect g^b value the external verifier 402 may determine that the network is compromised. In an example, a first value may be transmitted to a plurality network devices, respective responses may be received from the plurality of network devices each including a second value, and it may be determined that a majority of the plurality of network devices has been compromised based on a count of matching second values of the respective responses that do not match an expected value. In an example, the count of matching second values not matching the expected value may exceed a count of other second values matching one or more other second values not matching the expected value. In an example, the count may exceed a count of second values matching the expected value.

Using the DH protocol in a clock synchronization message may prevent an attacker from resetting the clock of a device on the network. By synchronizing the clocks of many devices at once it may make it difficult for an attacker to compromise a majority of devices. The attacker may need to compromise the clocks of a majority of devices at once which may be significantly more difficult than compromising the clock of a single device.

Figure 5:
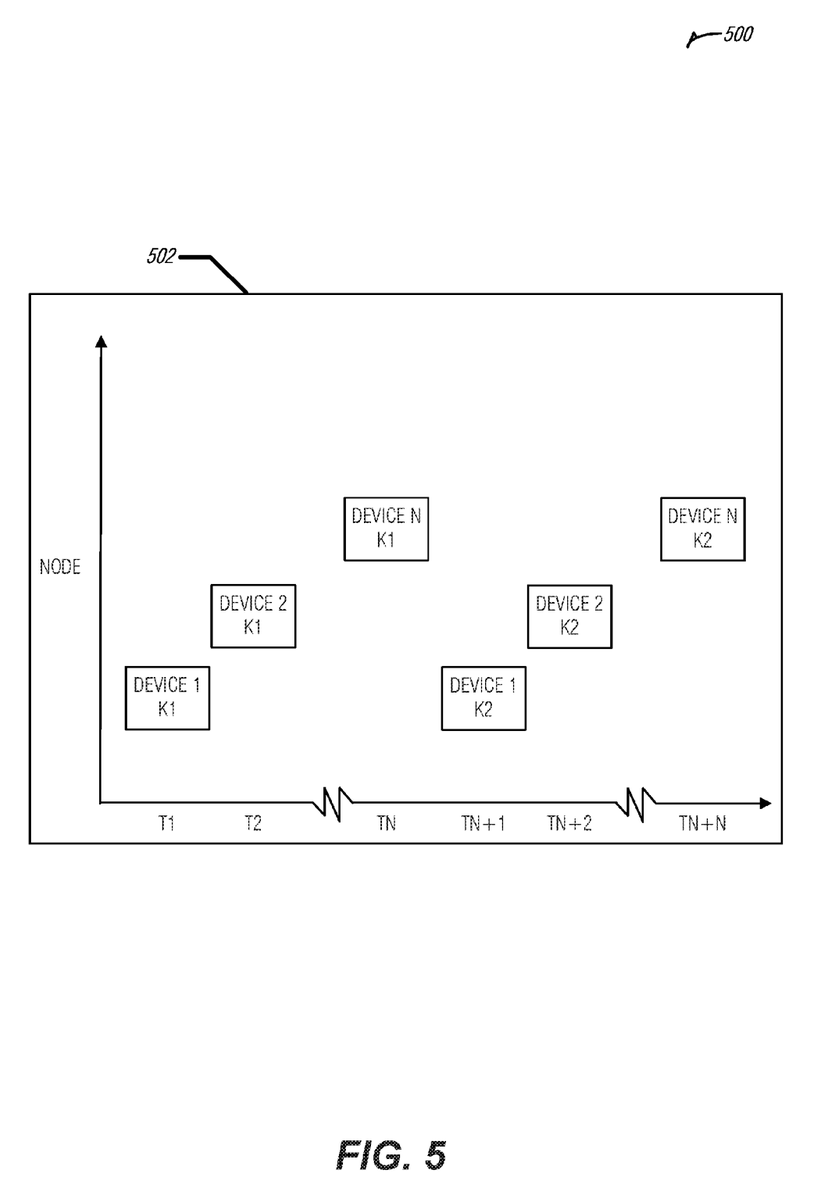
FIG. 5 illustrates an example of a key rotation for secure devices using entropy multiplexing, according to an embodiment.

FIG. 5 illustrates an example of a key rotation 500 for secure devices using entropy multiplexing, according to an embodiment. The key rotation 500 may employ the techniques described in FIGS. 1 and 2. Keys propagated among devices on a network may be rotated at time intervals. In an example, the keys may be rotated at a time interval corresponding with the time it takes for a key to be propagated to all devices of a network. For example, as shown in FIG. 2, the key may be propagated at differing time intervals by neighboring devices. For example, the first device to transmit the key may transmit the key at time t1, its neighbor may retransmit the key to its neighbor at time t2 and so on. The device that originated the key (e.g., device 1 originating key K1) may determine that the key has propagated to the entire network when it receives a message containing the key at time tN. The device may transmit a new key with an expiration time of tN so that the key's validity parallels the time it will take for a new key to propagate to the devices on the network. In some examples, a grace time period after which key expires may be used to address situations where a device does not receive a key update before expiration such as, for example, because of a packet delay. In an example, the expiration time may be tN+X wherein X is the grace time until which keys are valid for encryption and/or decryption. In some examples, the device may attest itself to a neighbor device and explicitly request a key. In an example, the device may wait for next key rotation.

For example, by time slot tN, if key K1 has been distributed to all devices on the network at tN, the key may be refreshed with key K2 at time slot tN+1. By rotating the keys quickly, the amount of content encrypted with the same key may be limited. With many possible devices encrypting content, the total cipher text produced with the same key may grow quickly. Rotating the key frequently may be more efficient than carefully tallying the total amount of cipher text created. New content may be encrypted using the freshest content key. Nevertheless, encrypted content may be decrypted using previously generated content keys before keys expire. The TEE that manages content keys may enforce the key use policies which may be configured to suit an application's requirements for content retention.

Figure 6:
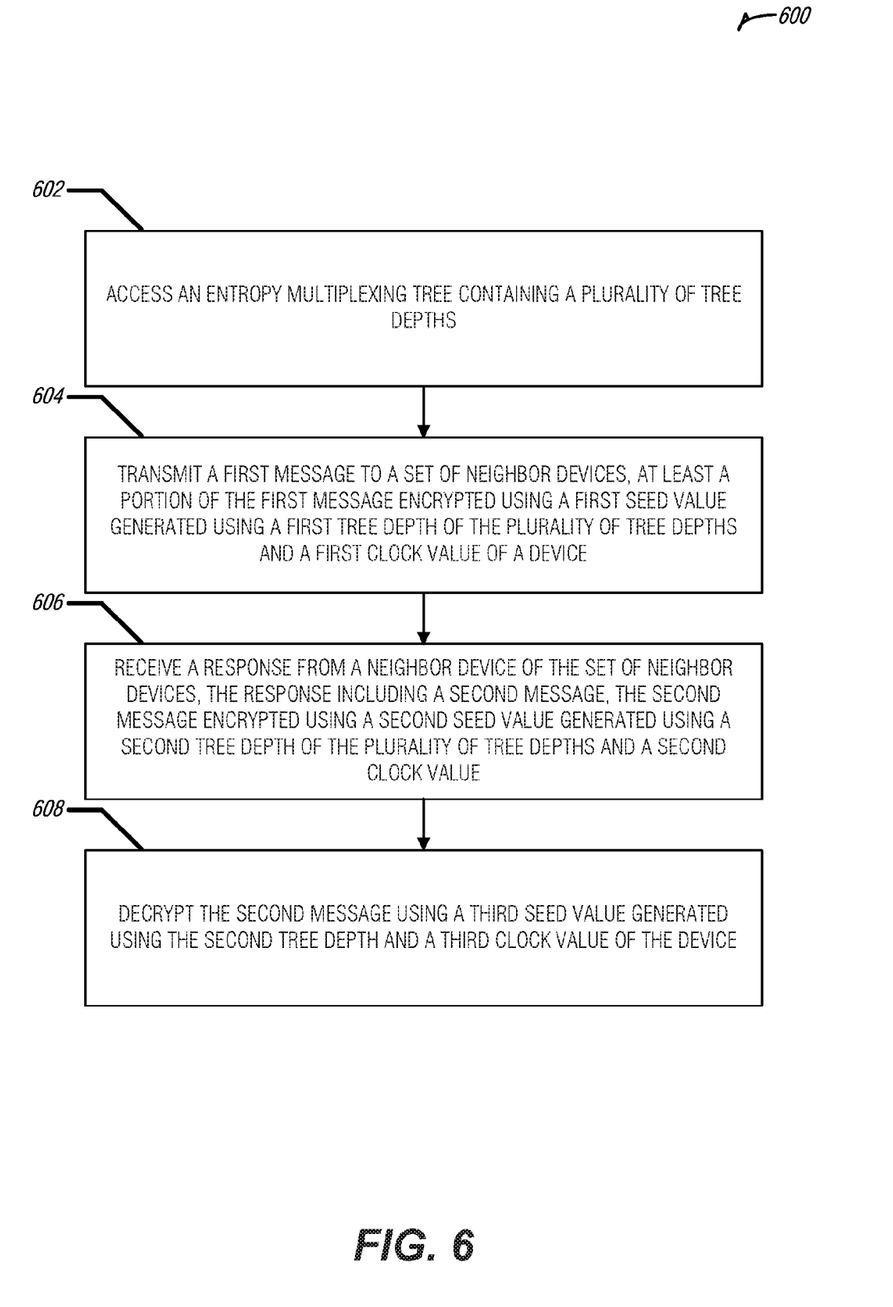
FIG. 6 illustrates an example of a method for implementing secure devices using entropy multiplexing, according to an embodiment.

FIG. 6 illustrates an example of a method 600 for implementing secure devices using entropy multiplexing, according to an embodiment. At operation 602, the method 600 may access an entropy-multiplexing (EM) tree containing a plurality of tree depths.

At operation 604, the method 600 may transmit a first message to a set of neighbor devices. In an example, the first message may be transmitted using a wireless transceiver. In an example, at least a portion of the first message may be encrypted using a first seed value generated using a first tree depth of the plurality of tree depths and a first clock value of a device. In an example, the at least a portion of the first message may include a group key. In an example, the at least one portion of the first message may be one of a content consumption key and a content publishing key. In some examples, the first message may be transmitted to a device on a different network using the neighbor device. In an example, the at least a portion of the first message includes a master clock value. In some examples, the master clock value may be received and a clock of the device may be synchronized using the master clock value.

At operation 606, the method 600 may receive a response from a neighbor device of the set of neighbor devices. In an example, the response may include a second message. In an example, the second message may be encrypted using a second seed value generated using a second tree depth of the plurality of tree depths and a second clock value.

At operation 608, the method 600 may decrypt the second message using a third seed value generated using the second tree depth and a third clock value of the device.

In some examples, a respective security configuration of each neighbor device of the set of neighbor devices may be received, a secure communication channel may be established with respective of the set of neighbor devices based on an evaluation of the respective security configuration against a set of acceptable security configurations, and the first message may be transmitted using the secure communication channel. In an example, the evaluation may include comparing a security key included in the security configuration with a security key included in the set of acceptable security configurations. In an example, the security key is an enhanced privacy identifier (EPID). In an example, the security key is an RSA key.

In some examples, a third message may be generated at a predetermined time interval, the third message may be encrypted using a fourth seed value generated using the first tree depth and a fourth clock value of the device. In an example, the time interval may be a period of time taken to transmit the first message to a set of devices on the network.

In some examples, a challenge message may be transmitted to a neighbor device of the set of neighbor devices using the first seed value, a challenge response may be received from the neighbor device, and secure communication may be discontinued with the neighbor device based on the challenge response being outside a designated threshold.

Figure 7:
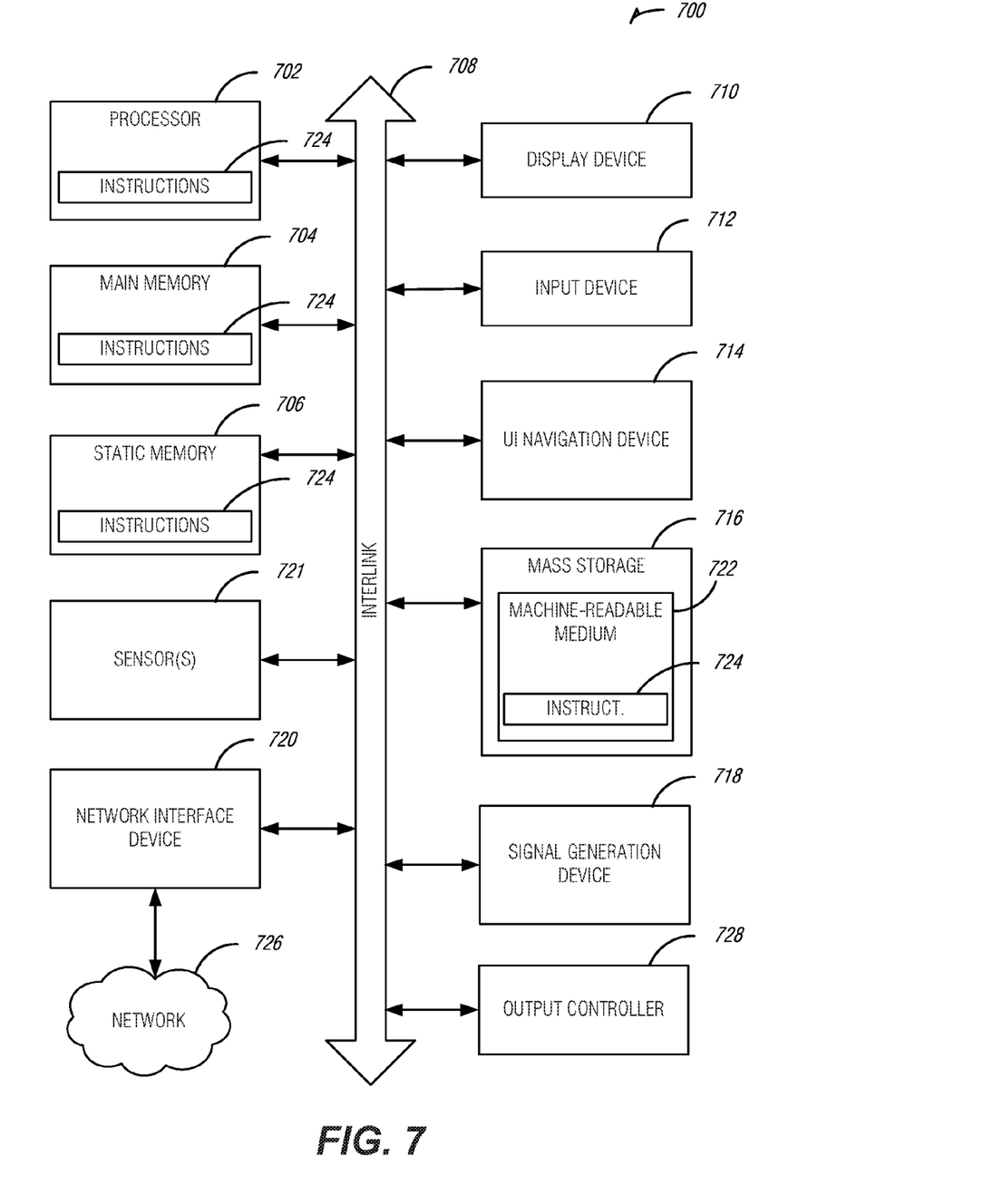
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

ADDITIONAL NOTES & EXAMPLES

Example 1 is a computing apparatus to implement secure devices using entropy multiplexing, the computing apparatus comprising: a processor; and a memory storing instructions that, when executed by the processor, configure the computing apparatus to: access an entropy-multiplexing (EM) tree containing a plurality of tree depths; transmit, using a wireless transceiver, a first message to a set of neighbor devices, at least a portion of the first message encrypted using a first seed value generated using a first tree depth of the plurality of tree depths and a first clock value of an originating device; receive a response from a neighbor device of the set of neighbor devices, the response including a second message, the second message encrypted using a second seed value generated using a second tree depth of the plurality of tree depths and a second clock value; and decrypt the second message using a third seed value generated using the second tree depth and a third clock value of the originating device.

In Example 2, the subject matter of Example 1 optionally includes, further comprising instructions that, when executed by the processor, configure the computing apparatus to: receive a respective security configuration of each neighbor device of the set of neighbor devices; establish a secure communication channel with respective devices of the set of neighbor devices based on an evaluation of the respective security configuration against a set of acceptable security configurations; and transmit the first message using the secure communication channel.

In Example 3, the subject matter of Example 2 optionally includes, wherein the evaluation includes comparing a security key included in the security configuration with a security key included in the set of acceptable security configurations.

In Example 4, the subject matter of Example 3 optionally includes, wherein the security key is an enhanced privacy identifier (EPID).

In Example 5, the subject matter of any one or more of Examples 3-4 optionally include, wherein the security key is an RSA key.

In Example 6, the subject matter of any one or more of Examples 1-5 optionally include, further comprising instructions that, when executed by the processor, configure the computing apparatus to: generate, at a predetermined time interval, a third message, the third message encrypted using a fourth seed value generated using the first tree depth and a fourth clock value of the originating device; and transmit the third message to the set of neighbor devices.

In Example 7, the subject matter of Example 6 optionally includes, wherein the time interval is approximately a period of time taken to transmit the first message to a set of devices on the network.

In Example 8, the subject matter of any one or more of Examples 1-7 optionally include, wherein the at least a portion of the first message includes a group key.

In Example 9, the subject matter of Example 8 optionally includes, wherein the group key is one of a content consumption key and a content publishing key.

In Example 10, the subject matter of any one or more of Examples 1-9 optionally include, further comprising instructions that, when executed by the processor, configure the computing apparatus to: transmit a first value to a plurality network devices; receive respective responses from the plurality of network devices including a second value; and determine that a majority of the plurality of network devices has been compromised based on a count of matching second values of the respective responses that do not match an expected value.

In Example 11, the subject matter of any one or more of Examples 1-10 optionally include, further comprising instructions that, when executed by the processor, configure the computing apparatus to: transmit the first message to a device on a different network using the neighbor device.

In Example 12, the subject matter of any one or more of Examples 1-11 optionally include, wherein the at least a portion of first message includes a master clock value.

In Example 13, the subject matter of Example 12 optionally includes, further comprising instructions that, when executed by the processor, configure the computing apparatus to: receive the master clock value; and synchronize a clock of the originating device using the master clock value.

In Example 14, the subject matter of any one or more of Examples 1-13 optionally include, further comprising instructions that, when executed by the processor, configure the computing apparatus to: transmit to a neighbor device of the set of neighbor devices a challenge message using the first seed value; receive a challenge response from the neighbor device; and discontinue secure communication with the neighbor device based on the challenge response being outside a designated threshold.

Example 15 is at least one computer-readable storage medium to implement secure devices using entropy multiplexing, the at least one computer-readable storage medium including instructions that when executed by a computer, cause the computer to: access an entropy-multiplexing (EM) tree containing a plurality of tree depths; transmit, using a wireless transceiver, a first message to a set of neighbor devices, at least a portion of the first message encrypted using a first seed value generated using a first tree depth of the plurality of tree depths and a first clock value of an originating device; receive a response from a neighbor device of the set of neighbor devices, the response including a second message, the second message encrypted using a second seed value generated using a second tree depth of the plurality of tree depths and a second clock value; and decrypt the second message using a third seed value generated using a third seed value generated using the second tree depth and a third clock value of the originating device.

In Example 16, the subject matter of Example 15 optionally includes, further comprising instructions that when executed by a computer, cause the computer to: receive a respective security configuration of each neighbor device of the set of neighbor devices; establish a secure communication channel with respective devices of the set of neighbor devices based on an evaluation of the respective security configuration against a set of acceptable security configurations; and transmit the first message using the secure communication channel.

In Example 17, the subject matter of Example 16 optionally includes, wherein the evaluation includes comparing a security key included in the security configuration with a security key included in the set of acceptable security configurations.

In Example 18, the subject matter of Example 17 optionally includes, wherein the security key is an enhanced privacy identifier (EPID).

In Example 19, the subject matter of any one or more of Examples 17-18 optionally include, wherein the security key is an RSA key.

In Example 20, the subject matter of any one or more of Examples 15-19 optionally include, further comprising instructions that when executed by a computer, cause the computer to: generate, at a predetermined time interval, a third message, the third message encrypted using a fourth seed value generated using the first tree depth and a fourth clock value of the originating device; and transmit the third message to the set of neighbor devices.

In Example 21, the subject matter of Example 20 optionally includes, wherein the time interval is approximately a period of time taken to transmit the first message to a set of devices on the network.

In Example 22, the subject matter of any one or more of Examples 15-21 optionally include, wherein the at least a portion of the first message includes a group key.

In Example 23, the subject matter of Example 22 optionally includes, wherein the group key is one of a content consumption key and a content publishing key.

In Example 24, the subject matter of any one or more of Examples 15-23 optionally include, further comprising instructions that when executed by a computer, cause the computer to: transmit a first value to a plurality network devices; receive respective responses from the plurality of network devices including a second value; and determine that a majority of the plurality of network devices has been compromised based on a count of matching second values of the respective responses that do not match an expected value.

In Example 25, the subject matter of any one or more of Examples 15-24 optionally include, further comprising instructions that when executed by a computer, cause the computer to: transmit the first message to a device on a different network using the neighbor device.

In Example 26, the subject matter of any one or more of Examples 15-25 optionally include, wherein the at least a portion of first message includes a master clock value.

In Example 27, the subject matter of Example 26 optionally includes, further comprising instructions that when executed by a computer, cause the computer to: receive the master clock value; and synchronize a clock of the originating device using the master clock value.

In Example 28, the subject matter of any one or more of Examples 15-27 optionally include, further comprising instructions that when executed by a computer, cause the computer to: transmit to a neighbor device of the set of neighbor devices a challenge message using the first seed value; receive a challenge response from the neighbor device; and discontinue secure communication with the neighbor device based on the challenge response being outside a designated threshold.

Example 29 is a method to implement secure devices using entropy multiplexing, comprising electronic operations, which when performed by circuitry of a computing device, causes the computing device to perform the electronic operations including: accessing an entropy-multiplexing (EM) tree containing a plurality of tree depths; transmitting, using a wireless transceiver, a first message to a set of neighbor devices, at least a portion of the first message encrypted using a first seed value generated using a first tree depth of the plurality of tree depths and a first clock value of an originating device; receiving a response from a neighbor device of the set of neighbor devices, the response including a second message, the second message encrypted using a second seed value generated using a second tree depth of the plurality of tree depths and a second clock value; and decrypting the second message using a third seed value generated using the second tree depth and a third clock value of the originating device.

In Example 30, the subject matter of Example 29 optionally includes, further comprising: receiving a respective security configuration of each neighbor device of the set of neighbor devices; establishing a secure communication channel with respective devices of the set of neighbor devices based on an evaluation of the respective security configuration against a set of acceptable security configurations; and transmitting the first message using the secure communication channel.

In Example 31, the subject matter of Example 30 optionally includes, wherein evaluation includes comparing a security key included in the security configuration with a security key included in the set of acceptable security configurations.

In Example 32, the subject matter of Example 31 optionally includes, wherein the security key is an enhanced privacy identifier (EPID).

In Example 33, the subject matter of any one or more of Examples 31-32 optionally include, wherein the security key is an RSA key.

In Example 34, the subject matter of any one or more of Examples 29-33 optionally include, further comprising: generating, at a predetermined time interval, a third message, the third message encrypted using a fourth seed value generated using the first tree depth and a fourth clock value of the originating device; and transmitting the third message to the set of neighbor devices.

In Example 35, the subject matter of Example 34 optionally includes, wherein the time interval is approximately a period of time taken to transmit the first message to a set of devices on the network.

In Example 36, the subject matter of any one or more of Examples 29-35 optionally include, wherein the at least a portion of the first message includes a group key.

In Example 37, the subject matter of Example 36 optionally includes, wherein the group key is one of a content consumption key and a content publishing key.

In Example 38, the subject matter of any one or more of Examples 29-37 optionally include, further comprising: transmitting a first value to a plurality network devices; receiving respective responses from the plurality of network devices including a second value; and determining that a majority of the plurality of network devices has been compromised based on a count of matching second values of the respective responses that do not match an expected value.

In Example 39, the subject matter of any one or more of Examples 29-38 optionally include, further comprising: transmitting the first message to a device on a different network using the neighbor device.

In Example 40, the subject matter of any one or more of Examples 29-39 optionally include, wherein the at least a portion of first message includes a master clock value.

In Example 41, the subject matter of Example 40 optionally includes, further comprising: receiving the master clock value; and synchronizing a clock of the originating device using the master clock value.

In Example 42, the subject matter of any one or more of Examples 29-41 optionally include, further comprising: transmitting to a neighbor device of the set of neighbor devices a challenge message using the first seed value;

receiving a challenge response from the neighbor device; and discontinuing secure communication with the neighbor device based on the challenge response being outside a designated threshold.

Example 43 is a system to implement secure devices using entropy multiplexing, the system comprising means to perform any method of Examples 29-42.

Example 44 is a machine readable medium to implement secure devices using entropy multiplexing, the machine readable medium including instructions that, when executed by a machine, cause the machine to perform any method of Examples 29-42.

Example 45 is a system to implement secure devices using entropy multiplexing, the system comprising: means for accessing an entropy-multiplexing (EM) tree containing a plurality of tree depths; means for transmitting, using a wireless transceiver, a first message to a set of neighbor devices, at least a portion of the first message encrypted using a first seed value generated using a first tree depth of the plurality of tree depths and a first clock value of an originating device; means for receiving a response from a neighbor device of the set of neighbor devices, the response including a second message, the second message encrypted using a second seed value generated using a second tree depth of the plurality of tree depths and a second clock value; and means for decrypting the second message using a third seed value generated using the second tree depth and a third clock value of the originating device.

In Example 46, the subject matter of Example 45 optionally includes, further comprising: means for receiving a respective security configuration of each neighbor device of the set of neighbor devices; means for establishing a secure communication channel with respective devices of the set of neighbor devices based on an evaluation of the respective security configuration against a set of acceptable security configurations; and means for transmitting the first message using the secure communication channel.

In Example 47, the subject matter of Example 46 optionally includes, wherein evaluation includes comparing a security key included in the security configuration with a security key included in the set of acceptable security configurations.

In Example 48, the subject matter of Example 47 optionally includes, wherein the security key is an enhanced privacy identifier (EPID).

In Example 49, the subject matter of any one or more of Examples 47-48 optionally include, wherein the security key is an RSA key.

In Example 50, the subject matter of any one or more of Examples 45-49 optionally include, further comprising: means for generating, at a predetermined time interval, a third message, the third message encrypted using a fourth seed value generated using the first tree depth and a fourth clock value of the originating device; and means for transmitting the third message to the set of neighbor devices.

In Example 51, the subject matter of Example 50 optionally includes, wherein the time interval is approximately a period of time taken to transmit the first message to a set of devices on the network.

In Example 52, the subject matter of any one or more of Examples 45-51 optionally include, wherein the at least a portion of the first message includes a group key.

In Example 53, the subject matter of Example 52 optionally includes, wherein the group key is one of a content consumption key and a content publishing key.

In Example 54, the subject matter of any one or more of Examples 45-53 optionally include, further comprising: means for transmitting a first value to a plurality network devices; means for receiving respective responses from the plurality of network devices including a second value; and means for determining that a majority of the plurality of network devices has been compromised based on a count of matching second values of the respective responses that do not match an expected value.

In Example 55, the subject matter of any one or more of Examples 45-54 optionally include, further comprising: means for transmitting the first message to a device on a different network using the neighbor device.

In Example 56, the subject matter of any one or more of Examples 45-55 optionally include, wherein the at least a portion of first message includes a master clock value.

In Example 57, the subject matter of Example 56 optionally includes, further comprising: means for receiving the master clock value; and means for synchronizing a clock of the originating device using the master clock value.

In Example 58, the subject matter of any one or more of Examples 45-57 optionally include, further comprising: means for transmitting to a neighbor device of the set of neighbor devices a challenge message using the first seed value; means for receiving a challenge response from the neighbor device; and means for discontinuing secure communication with the neighbor device based on the challenge response being outside a designated threshold.

Example 59 is a system to implement secure devices using entropy multiplexing, the system comprising: a processor; a memory; a seed generator module to access an entropy-multiplexing (EM) tree containing a plurality of tree depths; an encryption engine module to encrypt at least a portion of a first message using a first seed value generated by the seed generator module using a first tree depth of the plurality of tree depths and a first clock value of an originating device; a transceiver module to: transmit a first message to a set of neighbor devices; and receive, using the transceiver module, a response from a neighbor device of the set of neighbor devices, the response including a second message, the second message encrypted using a second seed value generated using a second tree depth of the plurality of tree depths and a second clock value; and decrypt, using the encryption engine module, the second message using a third seed value generated by the seed generator module using the second tree depth and a third clock value of the originating device.

In Example 60, the subject matter of Example 59 optionally includes, the transceiver module further to: receive a respective security configuration of each neighbor device of the set of neighbor devices; establish a secure communication channel with respective devices of the set of neighbor devices based on an evaluation of the respective security configuration against a set of acceptable security configurations; and transmit the first message using the secure communication channel.

In Example 61, the subject matter of Example 60 optionally includes, wherein the evaluation includes comparing a security key included in the security configuration with a security key included in the set of acceptable security configurations.

In Example 62, the subject matter of Example 61 optionally includes, wherein the security key is an enhanced privacy identifier (EPID).

In Example 63, the subject matter of any one or more of Examples 61-62 optionally include, wherein the security key is an RSA key.

In Example 64, the subject matter of any one or more of Examples 59-63 optionally include, the encryption engine module further to: generate, at a predetermined time interval, a third message, the third message encrypted using a fourth seed value generated by the seed generator module using the first tree depth and a fourth clock value of the originating device; and wherein the transceiver module is further to transmit the third message to the set of neighbor devices.

In Example 65, the subject matter of Example 64 optionally includes, wherein the time interval is approximately a period of time taken to transmit the first message to a set of devices on the network.

In Example 66, the subject matter of any one or more of Examples 59-65 optionally include, wherein the at least a portion of the first message includes a group key.

In Example 67, the subject matter of Example 66 optionally includes, wherein the group key is one of a content consumption key and a content publishing key.

In Example 68, the subject matter of any one or more of Examples 59-67 optionally include, the transceiver module further to: transmit a first value to a plurality network devices; receive respective responses from the plurality of network devices including a second value; and the encryption engine module further to: determine that a majority of the plurality of network devices has been compromised based on a count of matching second values of the respective responses that do not match an expected value.

In Example 69, the subject matter of any one or more of Examples 59-68 optionally include, the transceiver module further to: transmit the first message to a device on a different network using the neighbor device.

In Example 70, the subject matter of any one or more of Examples 59-69 optionally include, wherein the at least a portion of first message includes a master clock value.

In Example 71, the subject matter of Example 70 optionally includes, the transceiver module further to: receive the master clock value; and wherein a clock of the originating device is synchronized using the master clock value.

In Example 72, the subject matter of any one or more of Examples 59-71 optionally include, the transceiver module further to: transmit to a neighbor device of the set of neighbor devices a challenge message using the first seed value; receive a challenge response from the neighbor device; and wherein secure communication is discontinued with the neighbor device based on the challenge response being outside a designated threshold.

What is claimed is:

1. A computing apparatus to implement secure devices using entropy multiplexing, the computing apparatus comprising:
    a processor; and
    a memory storing instructions that, when executed by the processor, configure the computing apparatus to:
    access an entropy-multiplexing (EM) tree containing a plurality of tree depths;
    transmit, using a wireless transceiver, a first message to a set of neighbor devices, at least a portion of the first message encrypted using a first seed value generated using a first tree depth of the plurality of tree depths and a first clock value of an originating device;
    receive a response from a neighbor device of the set of neighbor devices, the response including a second message, the second message encrypted using a second seed value generated using a second tree depth of the plurality of tree depths and a second clock value;
    decrypt the second message using a third seed value generated using the second tree depth and a third clock value of the originating device;
    generate, at a predetermined time interval, a third message, the third message encrypted using a fourth seed value generated using the first tree depth and a fourth clock value of the originating device, wherein the time interval is based on a period of time taken to transmit the first message to a set of devices on the network; and
    transmit the third message to the set of neighbor devices.

2. The computing apparatus of claim 1, further comprising instructions that, when executed by the processor, configure the computing apparatus to:
    receive a respective security configuration of each neighbor device neighbor devices;
    establish a secure communication channel with respective devices of the set of neighbor devices based on an evaluation of the respective security configuration against a set of acceptable security configurations; and
    transmit the first message using the secure communication channel.

3. The computing apparatus of claim 1, further comprising instructions that, when executed by the processor, configure the computing apparatus to:
    transmit the first message to a device on a different network using the neighbor device.

4. The computing apparatus of claim 1, wherein the at least a portion of first message includes a master clock value.

5. The computing apparatus of claim 4, further comprising instructions that, when executed by the processor, configure the computing apparatus to:
    receive the master clock value; and
    synchronize a clock of the originating device using the master clock value.

6. The computing apparatus of claim 3, further comprising instructions that, when executed by the processor, configure the computing apparatus to:
    transmit to a neighbor device of the set of neighbor devices a challenge message using the first seed value;
    receive a challenge response from the neighbor device; and
    discontinue secure communication with the neighbor device based on the challenge response being outside a designated threshold.

7. At least one non-transitory computer-readable storage medium to implement secure devices using entropy multiplexing, the at least one computer-readable storage medium including instructions that when executed by a computer, cause the computer to:
    access an entropy-multiplexing (EM) tree containing a plurality of tree depths;
    transmit, using a wireless transceiver, a first message to a set of neighbor devices, at least a portion of the first message encrypted using a first seed value generated using a first tree depth of the plurality of tree depths and a first clock value of an originating device;
    receive a response from a neighbor device of the set of neighbor devices, the response including a second message, the second message encrypted using a second seed value generated using a second tree depth of the plurality of tree depths and a second clock value;
    decrypt the second message using a third seed value generated using a third seed value generated using the second tree depth and a third clock value of the originating device;
    generate, at a predetermined time interval, a third message, the third message encrypted using a fourth seed value generated using the first tree depth and a fourth clock value of the originating device, wherein the time interval is based on a period of time taken to transmit the first message to a set of devices on the network; and
transmit the third message to the set of neighbor devices.

8. The at least one computer-readable storage medium of claim 7, further comprising instructions that when executed by a computer, cause the computer to:
receive a respective security configuration of each neighbor device of the set of neighbor devices;
establish a secure communication channel with respective devices of the set of neighbor devices based on an evaluation of the respective security configuration against a set of acceptable security configurations; and
transmit the first message using the secure communication channel.

9. The at least one computer-readable storage medium of claim 7, further comprising instructions that when executed by a computer, cause the computer to:
transmit the first message to a device on a different network using the neighbor device.

10. The at least one computer-readable storage medium of claim 7, wherein the at least a portion of first message includes a master clock value.

11. The at least one computer-readable storage medium of claim 10, further comprising instructions that when executed by a computer, cause the computer to:
receive the master clock value; and
synchronize a clock of the originating device using the master clock value.

12. The at least one computer-readable storage medium of claim 7, further comprising instructions that when executed by a computer, cause the computer to:
transmit to a neighbor device of the set of neighbor devices a challenge message using the first seed value;
receive a challenge response from the neighbor device; and
discontinue secure communication with the neighbor device based on the challenge response being outside a designated threshold.

13. A method to implement secure devices using entropy multiplexing, comprising electronic operations, which when performed by circuitry of computing device, causes the computing device to perform the electronic operations including:
accessing an entropy-multiplexing (EM) tree containing a plurality of tree depths;
transmitting, using a wireless transceiver, a first message to a set of neighbor devices, at least a portion of the first message encrypted using a first seed value generated using a first tree depth of the plurality of tree depths and a first clock value of an originating device;
receiving a response from a neighbor device of the set of neighbor devices, the response including a second message, the second message encrypted using a second seed value generated using a second tree depth of the plurality of tree depths and a second clock value;
decrypting the second message using a third seed value generated using the second tree depth and a third clock value of the originating device;
generating, at a predetermined time interval, a third message, the third message encrypted using a fourth seed value generated using the first tree depth and a fourth clock value of the originating device, wherein the time interval is based on a period of time taken to transmit the first message to a set of devices on the network; and
transmitting the third message to the set of neighbor devices.

14. The method of claim 13, further comprising:
receiving a respective security configuration of each neighbor device of the set of neighbor devices;
establishing a secure communication channel with respective devices of the set of neighbor devices based on an evaluation of the respective security configuration against a set of acceptable security configurations; and
transmitting the first message using the secure communication channel.

15. The method of claim 13, further comprising:
transmitting the first message to a device on a different network using the neighbor device.

16. The method claim 13, wherein the at least a portion of first message includes a master clock value.

17. The method of claim 16, further comprising:
receiving the master clock value; and
synchronizing a clock of the originating device using the master clock value.

18. The method of claim 13, further comprising:
transmitting to a neighbor device of the set of neighbor devices a challenge message using the first seed value;
receiving a challenge response from the neighbor device; and
discontinuing secure communication with the neighbor device based on the challenge response being outside a designated threshold.

* * * * *

UNITED STATES PATENT AND TRADEMARK OFFICE
CERTIFICATE OF CORRECTION

PATENT NO. : 9,930,021 B2
APPLICATION NO. : 14/988210
DATED : March 27, 2018
INVENTOR(S) : Smith et al.

It is certified that error appears in the above-identified patent and that said Letters Patent is hereby corrected as shown below:

In the Claims

In Column 18, Line 12, in Claim 2, after "device", insert --of the set of--

In Column 18, Line 33, in Claim 6, delete "claim 3," and insert --claim 1,-- therefor In Column 19, Line 41, in Claim 13, before "computing", insert --a--

In Column 20, Line 33, in Claim 16, after "method", insert --of--

Signed and Sealed this
Nineteenth Day of May, 2020

Andrei Iancu
*Director of the United States Patent and Trademark Office*